United States Patent
McDonald et al.

[11] 3,771,798
[45] Nov. 13, 1973

[54] METHOD OF REPAIRING KNIFE EDGE FINS IN SPACER FLUID SEALS

[76] Inventors: George L. McDonald, 6806 E. 74th, Tulsa, Okla. 74133; Michael L. Jackson, 2216-½ N. Sheridan, Tulsa, Okla. 74115

[22] Filed: May 11, 1972

[21] Appl. No.: 240,829

[52] U.S. Cl.................. 277/9, 29/401, 29/DIG. 34, 277/1, 277/236, 287/23
[51] Int. Cl............................................ F16j 15/16
[58] Field of Search ..................... 277/1, 9, 11, 236; 29/401, DIG. 34

[56] References Cited
UNITED STATES PATENTS

| | | | |
|---|---|---|---|
| 2,874,005 | 2/1959 | Engström | 29/401 X |
| 3,147,544 | 9/1964 | Connors et al. | 29/401 |
| 3,123,364 | 3/1964 | Ennis | 277/1 |
| 3,537,713 | 11/1970 | Matthews et al. | 277/55 |
| 3,637,223 | 1/1972 | Weber | 277/236 X |
| 3,694,882 | 10/1972 | Desmond | 23/DIG. 34 |

Primary Examiner—Charles W. Lanham
Assistant Examiner—D. C. Reiley, III
Attorney—Charles S. Holmes

[57] ABSTRACT

Disclosed herein is a method for the repair of knife edge fins generally utilized as spacer fluid seals in, for example, compressor and turbine rotating and stationary members. The knife edge fins become worn after extreme use through subjection to high temperature, corrosive gases and abrasive contacting, so as to require frequent replacement thereof. The method disclosed herein eliminates the necessity of replacing the entire knife edge fin and spacer or other apparatus upon which the fin may be mounted through a means of repairing the same.

10 Claims, 5 Drawing Figures

PATENTED NOV 13 1973 3,771,798

METHOD OF REPAIRING KNIFE EDGE FINS IN SPACER FLUID SEALS

BACKGROUND OF THE INVENTION

The present invention relates to the repair and replacement of knife edge fins. More particularly, the present invention represents a method wherein knife edge fins may be repaired and replaced both economically and efficiently without requiring the entire replacement of the apparatus upon which the knife edge fins are positioned.

The modern advent of gas driven turbines and compressors, non-turbine apparatus requiring sealing, and other apparatus containing knife edge fins has found that rapid degradation of the metals utilized within the turbine, compressor and other gas driven rotating bodies is experienced. This wear causes destructive metallic wear and necessitates the frequent replacement of metallic parts containing the knife edge fins or fluid seals contained within the apparatus. The critical tolerances and strengths of materials required for repairing knife edge fins and the associated apparatus have obviated the development of any method by which the destroyed or degraded knife edge fins may be repaired without necessitating the complete replacement of the apparatus upon which the knife edge fin is contained.

Conventional replacement techniques, for example welding, precipitation of metals, destructive fissure regrowth, electron beam welding and plasma welding have all been found to be unacceptable for the replacement of extreme tolerance knife edge fin members. In particular, it is extremely difficult to determine the degree of destructive fissuring or whether material concentration of metals contained within the repaired knife edge has occurred without requiring extreme testing with the component from which the knife edge fin was removed. Generally destructive testing is necessitated in order to adequately determine whether or not the fin is sufficient for utilization within the turbine, compressor, or non-turbine apparatus. Conventional testing by X-rays diffraction and other non-destructive inspection techniques have been found unreliable to determine whether or not a sufficient weld or precipitation of metals thereon the component has been obtained. The unreliability of the tests coupled with the extent of the extreme operating conditions of the knife edge fins are extremely difficult to overcome. For example, the knife edge fins used on spacers in the turbine section of an engine operate at conditions in excess of 2000 revolutions per minute under low compression and a similar spacer may be utilized in a compressive section of a jet engine operating under high compression in excess of 2,000 rpm. These extremes in operation require that the part have high mechanical properties and gain lasting performance as if a new part had been substituted for the damaged part, which had undergone previous degradation during engine wear.

Therefore, what is required is a method and resulting apparatus for the replacement of knife edge fins upon apparatus which may be reused within a compressor, turbine or other apparatus without requiring complete replacement of the repaired part.

It is the object of the present invention to provide a method for the repair of knife edge fins.

It is a further object of the present invention to provide a method wherein knife edge fins or air seals may be repaired through a reconstruction of the knife edge fins upon the apparatus for which replacement is desired.

It is still a further object of the present invention to provide apparatus which may be formed from a part requiring repair or replacement through the utilization of a method for the repair of the degraded knife edge fin in order to provide apparatus which will afford continued usage.

With these and other objects in mind, the present invention may be more readily understood by referral to the accompanying drawings and following description:

SUMMARY OF THE INVENTION

The present invention provides a method for repairing a metallic and non-metallic knife edge fin or fluid seal, said in being formed of a sharpened blade, formed as a part of a component part to be sealed. which comprises the steps of honing the knife edge or the blade to form a flat surface thereacross the normally sharp blade. A subsequent step is provided of reaming a groove in the upper portion of the blade through the flat surface and placing a metallic wedge in the groove, said wedge having a height which in combination with the height of the blade forms a blade of the exact height of the blade of the original knife edge. The upper portion of said blade being sharpened to form a knife edge, an additional step is performed of crimping the side of the blade to close the groove about the wedge. When repairing a fin on the outer surface diameter of a part, the method may further comprise heating the blade and groove contained therein, prior to the introduction of the wedge, and then cooling the wedge prior to its introduction into the groove so that the thermal coefficient of expansion will expand the groove and contract the wedge such that a firm thermal fit may be formed during the cooling of the groove and the heating of the wedge. A similar method may be utilized for replacing fins on the inside diameter of a part.

In a preferred embodiment of the present invention a process is utilized wherein the knife edge fin is circular and the wedge is a circular band having a flat inner circumferential edge, and the external circumferential edge being sharpened to form a knife edge. In general it is preferred that the circular band have a greater malleability that that of the circular metallic knife edge fin. It is further preferred that the circular band exhibit a lower Young's modulus than the circular metallic knife edge fin. Should the metallic knife edge fin be precast, it may be made more malleable than the circular band by malleabilizing the casting by annealing the casting to convert the chemically combined carbon contained therein, at least partially, into free graphite carbon in rounded form.

The object of the present invention may further be accomplished through apparatus comprising a rebuilt metallic knife edge fin, said seal originally being formed of a sharper blade formed as a part of the component part to be sealed and the apparatus comprising a honed knife edge of the blade forming a flat surface having a groove reamed therein, and a metallic wedge having a sharpened upper portion thereof forming a knife edge and the lower portion thereof being crimped within the groove of the blade. In a preferred embodiment of the present invention, the apparatus may comprise a knife edge fin circular and the wedge being formed in a circular ring having a flat inner circumferential edge and an external circumferential edge being sharpened to form a knife edge.

BRIEF DESCRIPTION OF THE DRAWINGS

The application of the method and resulting apparatus of the present invention may be more readily understood by referral to the accompanying drawings, in which.

DETAILED DESCRIPTION OF THE INVENTION

The present invention involves a method, and apparatus formed by the same, for repairing degradated knife edge fins which have been damaged through operation under severe operating conditions. The repair operation is utilized wherein normally the component part upon which the knife edge fin is mounted must be discarded with new apparatus being required as a replacement part. In the method of the present invention, for repairing a metallic knife edge fin or gas seal, the fin is generally formed of a blade and a sharpened knife edge section contained thereon the blade. The knife edge fin and its disposition therewithin a compressor or other related apparatus may be more readily depicted by referral to the accompanying figures.

Figure 1:
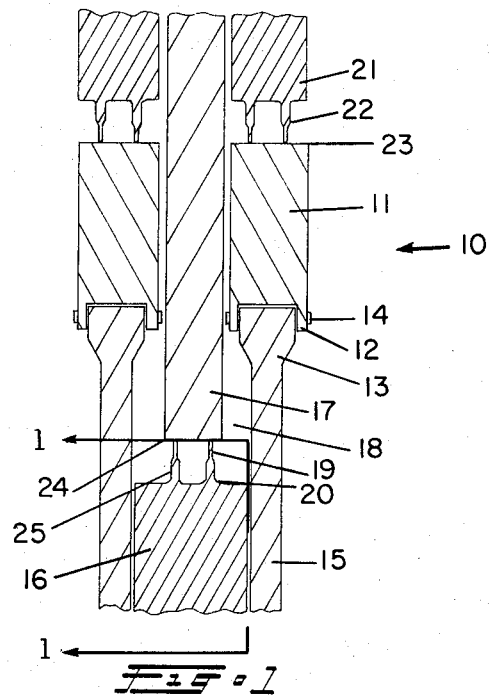
FIG. 1 represents a cross sectional view of a compressor section of a jet propulsion engine showing the disposition of several knife edge fins utilized as gas seals on a spacer band within the compressor section of the jet propulsion engine.

In particular, in FIG. 1 is depicted a compressor section 10 of a jet propulsion engine containing therein compressor fins 11, pivotally connected through pins 14 and arm 12 of compressor fin 11 to compressor arm 15, attached to the compressor rotor not depicted in FIG. 1. A housing shield 17 is shown extending therein the compressor section forming a gas space 18 therebetween the housing 17 and the compressor arm 15 and fin 11 so as to require gas flow sealing at the surfaces contained between the housing 17 and the compressor fin 11. The gas seal is formed through introduction of spacers 21 and 16 having thereon knife edge fins 22 and 25, respectively. The knife edge fins 22 and 25 contact the upper edge of the compressor fin 23 and the lower edge of the housing arm 24, respectively, so as to form a gas seal. The gas seal and knife edge fins are exaggerated in dimension to illustrate their position.

The introduction of the knife edge fins 22 and 25, respectively, cause the hot gases from the jet propulsion engine to be forced against the compressor fins 11, not allowing gas to circulate through the exaggerated clearances between the spacer 21 and the upper edge of the compressor fin 23 and the spacer 16 and the lower edge of the housing arm 24. The forced gas flow requires the compressor fin 11 and arm 15 attached thereto, to rotate, causing the drive momentum of the jet propulsion engine.

Figure 2:
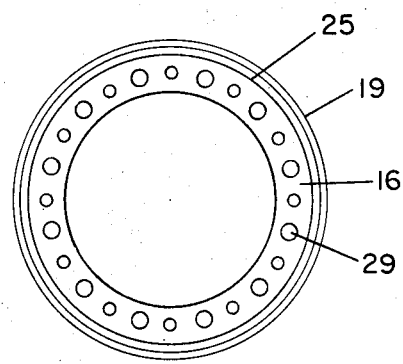
FIG. 2 illustrates a side view of a spacer band as taken along line 1,1 of FIG. 1 depicting thereon the knife edge fins utilized in order to seal hot gases passed through the compressor section.

The particular disposition of the knife edge fin upon a circular spacer is more readily depicted in FIG. 2. FIG. 2 being a cross sectional view taken along line 1,1 of FIG. 1 illustrating the spacer band 16 as shown having weight-reducing and metal-saving holes 29 contained therein, said holes 29 affording expansion of the spacer band 16 and reduction inertia thereof. The spacer band 16 has mounted on a circumferential surface area thereof a blade 25, and knife edge 19 contained thereon, for forming a knife edge fin or gas seal of the present invention. As disclosed the knife edge fin is subjected to tremendous operating conditions and often is exposed to corrosive operating conditions requiring the knife edge fin to be formed of materials having high abrasive wear characteristics. Unfortunately, often these materials are easily degradated under the tremendous operating conditions required for the usage of the knife edge fin requiring frequent replacement of the part upon which the knife edge fin is contained. Replacement of the knife edge fins being both expensive and time consuming requiring a new part to be relocated within the apparatus from which the worn knife edge fin is removed.

Figure 3:
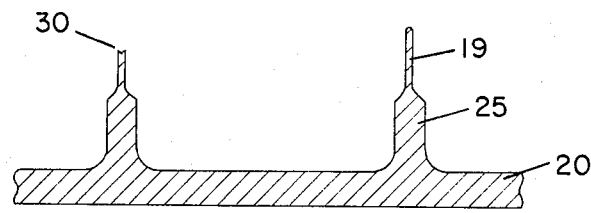
FIG. 3 represents a cross sectional side view of a knife edge fin assembly as positioned upon the upper portion of a spacer band or other apparatus utilized in order to seal gas movement.
Figure 4:
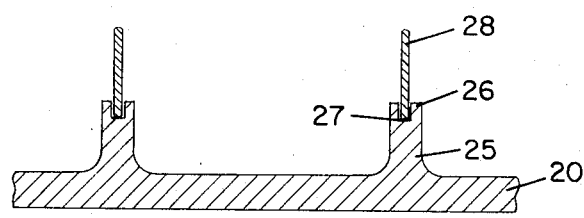
FIG. 4 depicts a partially repaired knife edge fin, as repaired by the method of the present invention, having a sharpened wedge positioned within a honed, degraded knife edge fin.
Figure 5:
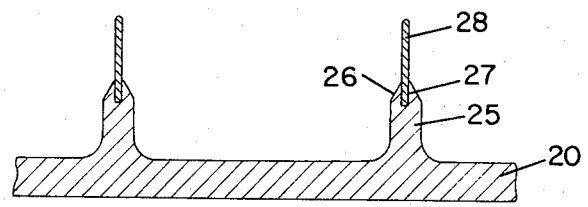
FIG. 5 represents the apparatus of the present invention depicting therein the knife edge fin as repaired upon the spacer band, or other component upon which the repaired knife edge fin is positioned, in order to provide a repaired knife edge fin for further utilization.

By referral to FIG. 3, a cross sectional view of a blade 25 and knife edge 19 contained thereon a spacer band 20, illustrates a knife edge fin to be utilized for a fluid seal. The method for repairing a metallic or non-metallic knife edge fin of the present invention, may be more readily understood through a knowledge of the formation of a blade 25 and knife edge surface 19. In particular, when degradation of the knife edge occurs, for example, the broken knife edge 30 depicted in FIG. 3, repair or replacement of the component is required. The initial step of the method of the present invention comprises honing the knife edge 19 of the blade 25 to form a flat surface thereacross the normally sharp blade 25. By referring to FIG. 4, the honed knife edge and blade may be more readily disclosed as having a flat surface 26 contained thereupon blade 25 of spacer 20. A groove 27 is reamed in the upper portion of the blade 25 across the flat edge 26. A metallic wedge 28 is positioned within the groove 27, said wedge 28 having a height, which in combination with the height of the blade 25, forms the knife edge fin of the exact height of the blade 25 and knife edge 19 of the original knife edge fin as depicted in FIG. 3. Said upper portion of the wedge 28 is sharpened to form a knife edge. Subsequent to the positioning of the wedge 28 within the groove 27 of the honed blade 25, the sides of the blade 25 are crimped in order to close the groove 27 about the wedge 28 as depicted in FIG. 5. The crimping operation forms a repaired and improved knife edge fin comprising a wedge 28 crimped within the groove 27 of the blade 25 having the flat honed surface 26 now crimped in an angled position so as to form a smooth, contoured knife edge fin upon the surface 20 of the spacer band or other object being repaired.

As previously disclosed, the method of the present invention may provide an apparatus comprising a rebuilt metallic or non-metallic knife edge fin. In general, the knife edge fin is originally formed of a sharpened blade formed as a part of a component to be sealed with the improved apparatus comprising a blade having a honed knife edge forming a flat surface and having a groove reamed therein.

As depicted the knife edge fin may be circular and the wedge comprise a circular band having a flat inner circumferential edge, the external circumferential edge being sharpened to form the knife edge. It is generally preferred that the circular band have a greater malleability than the circular metllic knife edge fin and included blade, with the circular band exhibiting a lower Young's modulus than the circular metallic knife edge fin and included blade. Within the operation of the method of the present invention, the metallic knife edge fin and included blade may be precast and made more malleable than the circular blade by malleabizing the casting by annealing the casting to convert the chemically combined carbon contained therein, at least partially, into free graphite carbon in rounded form. Malleabilizing may be obtained by subjecting the casting under a nitrogen atmosphere to temperatures in excess of 1,000° Farenheit. Generally the wedge will have a greater malleability than the metallic knife edge fin and included blade to ease the crimping operation and therein form the smooth surface required for the knife edge fin. The wedge exhibits a lower Young's modulus than the metallic blade of the knife edge fin in order not to be as easily extruded or transformed during the crimping operation. The repaired knife edge fin may be utilized within a compressor or turbine application and other applications.

As disclosed and depicted herein, the materials of construction for repairing a knife edge fin as disclosed may be comprised of any metallic materials, for example a high tensile strength steel which after crimping within the groove formed upon the honed surface of the degradated blade may be further enhanced for corrosive properties through anodizing the metallic surface or plating the surface with a high corrosion-resistant material, such as nickel, cadmium or zinc.

Therefore, through utilization of the apparatus and method of the present invention, one is provided with a means for repairing or replacing knife edge fins which are degradated due to extreme operating conditions of the parts from which the components are removed. In particular, the major portion of the component part need not be reworked or repaired. It merely requires the application of the method of the present invention in order to readily provide an improved part in a repaired state which may be placed within the apparatus from which it was removed and utilized for a long service period thereafter.

The present invention has been described herein with reference to particular embodiments thereof. It will be appreciated, however, by those skilled in the art, that various changes and modifications may be made without departing from the scope of the invention as set forth herein.

Therefore, we claim:

1. A method for repairing a knife edge fin, said fin being formed of a sharpened blade formed as a part of a component part to be sealed, which comprises:
   a. honing the knife edge of the blade to form a flat surface thereacross the normally sharp blade;
   b. reaming a groove in the upper portion of the blade, through the flat surface;
   c. placing a metallic wedge within the groove, said wedge having a height which in combination with the height of the blade forms a knife edge fin of the exact height of the blade and knife edge of the original knife edge fin, said upper portion of said wedge being sharpened to form a knife edge; and
   crimping the sides of the blade to close the groove about the wedge.

2. The method of claim 1 in which the knife edge fin is circular and the wedge is a circular band having a flat inner circumferential edge and the external circumferential edge is sharpened to form the knife edge.

3. The method of claim 2 in which the knife edge fin is positioned on the outside diameter of the part and further comprising:
   a. heating the blade and groove contained therein prior to the introduction of the wedge; and
   b. cooling the wedge prior to its introduction into the groove.

4. The method of claim 3 in which the circular band has a greater malleability than the circular metallic knife edge fin and included blade.

5. The method of claim 4 in which the circular band exhibits a lower Young's modulus than the circular metallic knife edge fin and included blade.

6. The method of claim 4 in which the metallic knife edge fin and included blade are precast and made more malleable than the circular band by malleabilizing the casting by annealing the casting to convert the chemically combined carbon contained therein, at least partially, into free graphite carbon in rounded form.

7. The method of claim 2 in which the wedge has a greater malleability than the metallic knife edge fin and included blade.

8. The method of claim 7 in which the wedge exhibits a lower Young's modulus than the metallic knfe edge fin and included blade.

9. Apparatus comprising a rebuilt metallic knife edge fin, said knife edge fin originally being formed of a sharpened blade formed as a part of a component part to be sealed, which comprises:
   a. a blade having a honed knife edge forming a flat surface having a groove reamed therein; and
   b. a metallic wedge, having a sharpened upper portion thereof forming a knife edge, and the lower portion thereof being crimped within the groove of the blade.

10. The apparatus of claim 9 in which the knife edge fin is circular and the wedge is a circular band having a flat inner circumferential edge and an external circumferential edge being sharpened to form a knife edge.

* * * * *